(12) United States Patent
Quinn et al.

(10) Patent No.: US 11,663,083 B2
(45) Date of Patent: May 30, 2023

(54) CYBER-RELATED DATA RECOVERY

(71) Applicant: Dell Products L.P., Round Rock, TX (US)

(72) Inventors: Brett Quinn, Cotuit, MA (US); Doug Lecrone, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/514,000

(22) Filed: Oct. 29, 2021

(65) Prior Publication Data

US 2023/0134674 A1 May 4, 2023

(51) Int. Cl.
*G06F 11/14* (2006.01)
*G06F 1/12* (2006.01)

(52) U.S. Cl.
CPC ............ *G06F 11/1448* (2013.01); *G06F 1/12* (2013.01); *G06F 11/1456* (2013.01); *G06F 2201/805* (2013.01)

(58) Field of Classification Search
CPC .. G06F 11/14; G06F 11/1448; G06F 11/1456; G06F 2201/805
See application file for complete search history.

(56) References Cited

U.S. PATENT DOCUMENTS

| | | | |
|---|---|---|---|
| 10,911,540 B1* | 2/2021 | Gunasekaran | G06F 9/541 |
| 2005/0216788 A1* | 9/2005 | Mani-Meitav | G06F 11/1464 714/E11.122 |
| 2015/0193315 A1* | 7/2015 | Cheong | G06F 11/1466 714/15 |
| 2019/0171532 A1* | 6/2019 | Abadi | H04L 67/1095 |
| 2020/0366708 A1* | 11/2020 | Raghunathan | H04L 63/20 |
| 2020/0394072 A1* | 12/2020 | Sreekantaswamy | G06F 11/0793 |
| 2021/0034992 A1* | 2/2021 | Mukeri | G06F 11/0757 |

* cited by examiner

*Primary Examiner* — Kamini B Patel
(74) *Attorney, Agent, or Firm* — Krishnendu Gupta; Nikhil Patel

(57) ABSTRACT

Embodiments of the present disclosure include receiving one or more input/output (IO) requests at a storage array from a host device. Furthermore, the IO requests can include at least one data replication and recovery operation. In addition, the host device's connectivity access to a recovery storage array can be determined. Data replication and recovery operations can be performed based on the host device's connectivity to the recovery storage array.

18 Claims, 6 Drawing Sheets

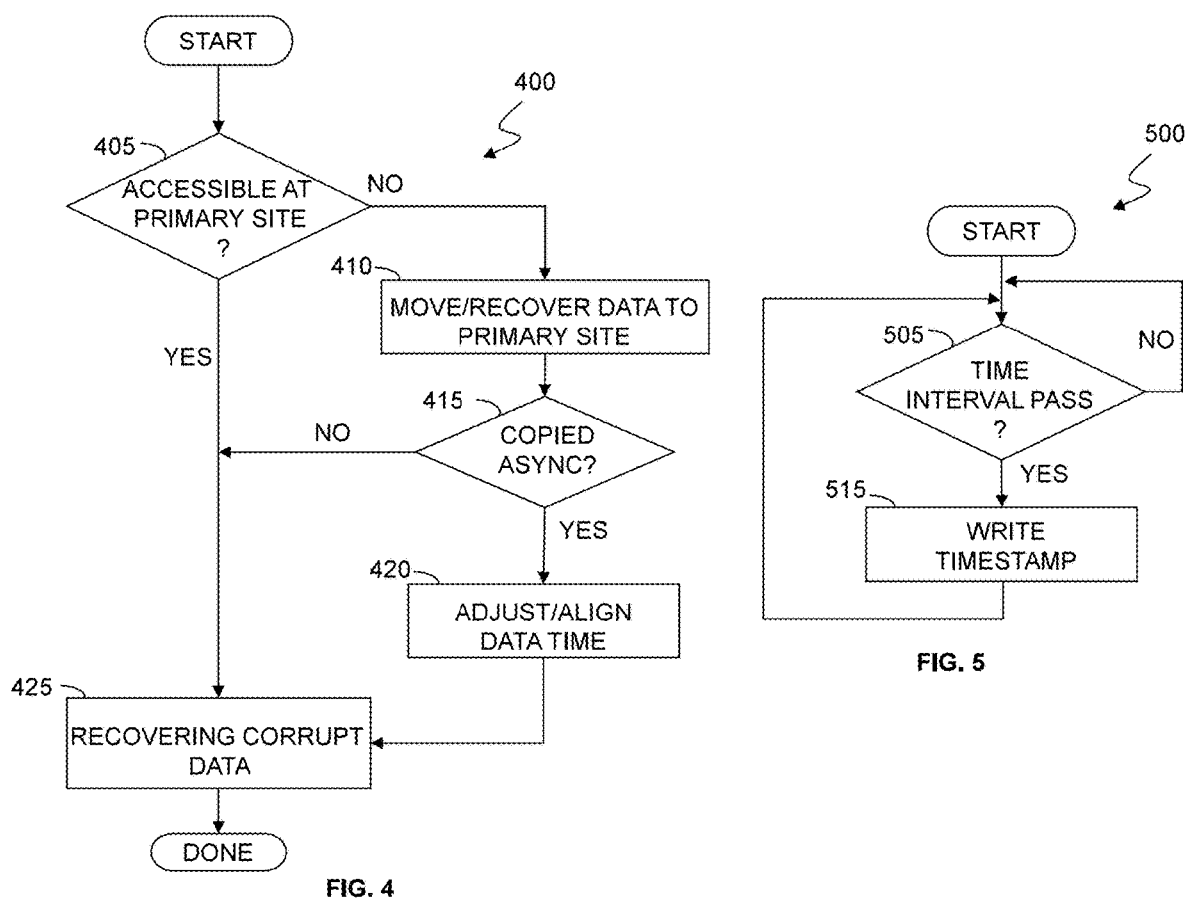

CYBER-RELATED DATA RECOVERY

BACKGROUND

Cyber resiliency and recovery have emerged as the most pressing problem to be solved in business continuity planning. Unlike disaster recovery, which focuses on recovery after a data center's physical loss, cyber recovery focuses on recovery from pervasive logical corruption, such as ransomware or errant data being introduced into the environment. The US National Institute for Standards (NIST) has developed a cyber security framework for organizations to develop their cyber security strategy. It contains five key elements: Identify, Protect, Detect, Respond and Recover.

SUMMARY

Embodiments of the present disclosure include receiving one or more input/output (IO) requests at a storage array from a host device. Furthermore, the IO requests can include at least one data replication and recovery operation. In addition, the host device's connectivity access to a recovery storage array can be determined. Data replication and recovery operations can be performed based on the host device's connectivity to the recovery storage array.

In embodiments, a storage system's replication topology and configuration can be determined. Additionally, the topology can include the storage array and the recovery storage array.

In embodiments, the host device can invoke the storage system to perform at least one data replication and recovery operation based on the host device's connectivity access to the recovery storage array.

In embodiments, the host device can be provided with connectivity access to the recovery storage array.

In embodiments, the host device can be given direct connectivity access to the recovery storage array based on the storage system's replication topology and configuration. In addition, the host device can be given indirect connectivity access to the recovery storage array based on the storage system's replication topology and configuration In embodiments, snapshots of the storage array's stored data can be generated. Further, a data recovery and replication operation can be performed in response to each snapshot generation In embodiments, recovery metadata can be generated in response to receiving an IO write request. Additionally, state information of a dataset related to the IO write request can be inserted into the recovery metadata based on the storage system's replication topology and configuration. Further, the recovery metadata can be provided with the state information and a timestamp of the dataset related to the IO write request based on the storage system's replication topology and configuration In embodiments, the host device's clock can be synchronized with the storage system's clock. Further, an application time related to the data set can be obtained.

In embodiments, a first data replication operation can update at least one track of the data set based on an updated schedule. Additionally, a second data replication operation can monitor the storage system's asynchronous replication lag time.

In embodiments, the host device can be enabled to link at least one of the snapshots to a recovery volume. Additionally, the host device can be enabled to evaluate the at least one linked snapshot. Further, the data replication and recovery operations can be performed in response to receiving one or more instructions from the host device.

BRIEF DESCRIPTION OF THE DRAWINGS

FIG. 4 is a flow diagram of a method for recovering corrupted data in accordance with embodiments of the present disclosure.

FIG. 5 is a flow diagram of a method for performing temporal-based data recovery operations in accordance with embodiments of the present disclosure.

DETAILED DESCRIPTION

As stated above, NIST has developed a cyber security framework for organizations to develop their cyber security strategy. The framework includes five key elements: Identify, Protect, Detect, Respond and Recover. While there has been significant development targeting the Identify, Protect, Detect, Respond elements, the Recovery element is still in the nascent stages of solution development.

Embodiments of the present disclosure enable host devices to provide immutable data copies that are recoverable. Additionally, the embodiments identify "good" data copies (e.g., uncorrupted and captured in a recoverable state). For example, the embodiments can identify good data in a multi-site environment. Further, the embodiments can recover good data copies at an object or dataset level.

Additionally, the embodiments can include an orchestration layer that can operate in storage area network (SAN) configurations. Specifically, the orchestration layer can perform recovery operations based on the physical location of the good data copies, server availability, and server processing capabilities. For example, the orchestration layer can extend disaster recovery—remote replication topology-aware tools to cyber recovery frameworks disclosed herein.

Figure 1:
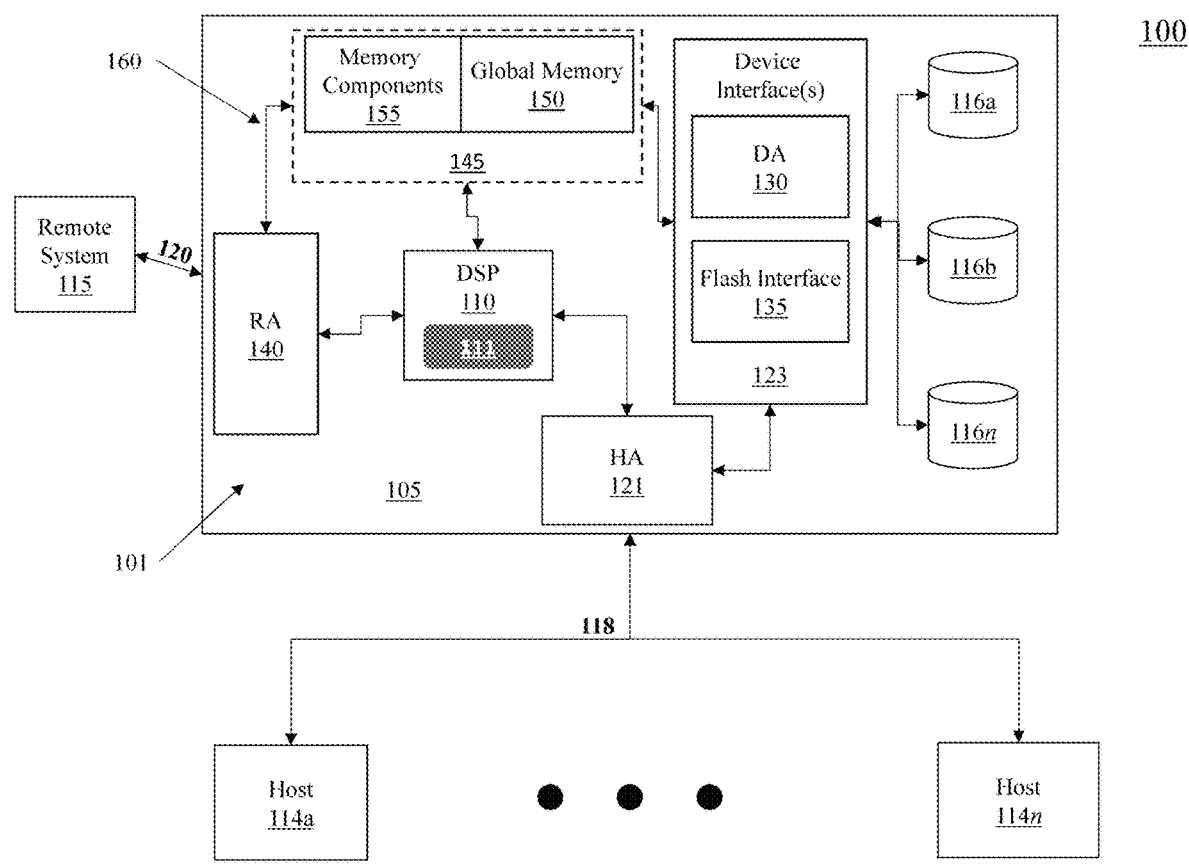
FIG. 1 is a block diagram of a storage array in accordance with embodiments of the present disclosure.

Regarding FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, or communication modules. For example, the array's global memory 150 can use the communication channels 160 to transfer data or send other communications between the array's components 101.

In embodiments, the array 105 and one or more devices can form a network. For example, the array 105 and host systems 114a-n can define a first communication network 118. Further, the first network's topology can have the hosts 114a-n and the array 105 physically co-located or remotely located from one another. Likewise, the array 105 and a remote system 115 can define a second communication network 120. Additionally, the array's RA 140 can manage communications between the array 105 and an external storage system (e.g., remote system 115) using the networks 118, 120. The networks 118,120 can be a wide area network (WAN) (e.g., Internet), local area network (LAN), intranet, Storage Area Network (SAN)), Explicit Congestion Notification (ECN) Enabled Ethernet network and the like.

In further embodiments, the array 105 and other networked devices (e.g., the hosts 114*a-n* and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like. For example, the remote system 115 can include one or more data backup arrays. As such, the array 105 can synchronously or asynchronously back up its stored data on the remote system 115.

The networked devices 105, 115*a-n*, 116, and the like can connect to the networks 118,120 via a wired/wireless network connection interface, bus, data link, and the like. Further, the networks 118, 120 can also include communication nodes that enable the networked devices to establish communication sessions. For example, communication nodes can include switching equipment, phone lines, repeaters, multiplexers, satellites, and the like.

In embodiments, the array's components 101 can receive and process input/output (IO) workloads. An IO workload can include one or more IO requests (e.g., read/write requests or other storage service-related operations) originating from the hosts 114*a-n* or remote system 115. For example, one or more hosts 114*a-n* can run an application that requires a read/write of data to the array 105.

In embodiments, the array 105 and remote system 115 can include a variety of proprietary or commercially available single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. For example, the memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114*a-n*). For example, the HA 121 can direct one or more IOs to an array component 101 for further storage processing. In embodiments, the HA 121 can direct an IO request to the array's device interface 123. The device interface 123 can manage the IO request's read/write data operation requiring access to the array's data storage devices 116*a-n*. For example, the data storage interface 123 can include a device adapter (DA) 130 (e.g., storage device controller), flash drive interface 135, and the like that controls access to the storage devices 116*a-n*. Likewise, the array's Data Services Processor (DSP) 110 can manage access to the array's local memory 145. In additional embodiments, the array's DSP 110 can perform one or more self-optimizing techniques (e.g., one or more machine learning techniques) to deliver performance, availability, and data integrity services for the array 105 and its components 101.

In embodiments, the array's storage devices 116*a-n* can include one or more data storage types, each having distinct performance capabilities. For example, the storage devices 116*a-n* can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be volatile or nonvolatile memory. Unlike nonvolatile memory, volatile memory requires power to store data. Thus, volatile memory loses its stored data if the array 105 loses power for any reason. The primary memory can include dynamic (RAM) and the like in embodiments, while cache memory can comprise static RAM, amongst other similar memory types. Like the array's storage devices 116*a-n*, the array's memory 145 can have different storage performance capabilities.

In embodiments, a service level agreement (SLA) can define at least one Service Level Objective (SLO) the hosts 114*a-n* require from the array 105. For example, the hosts 115*a-n* can include host-operated applications that generate or require data. Moreover, the data can correspond to distinct data categories, and thus, each SLO can specify a service level (SL) for each category. Further, each SL can define a storage performance requirement (e.g., a response time and uptime).

Figure 1A:
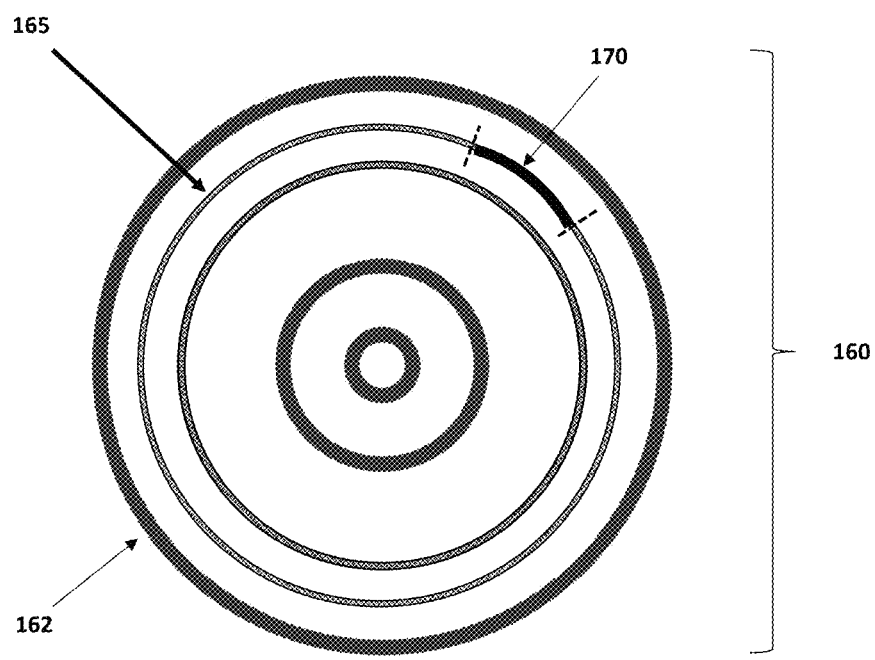
FIG. 1A is a cross-sectional view of a hard disk drive (HDD) in accordance with example embodiments of the present disclosure.

Regarding FIG. 1A, the array 105 can persistently store data on one of its storage devices 116*a-n*. For example, one of the array's storage devices 116*a-n* can include an HDD 160 having stacks of cylinders 162. Further, a cylinder 162, like a vinyl record's grooves, can include one or more tracks 165. Thus, the storage array 105 can store data on one or more portions of a disk's tracks 165.

Figure 3:
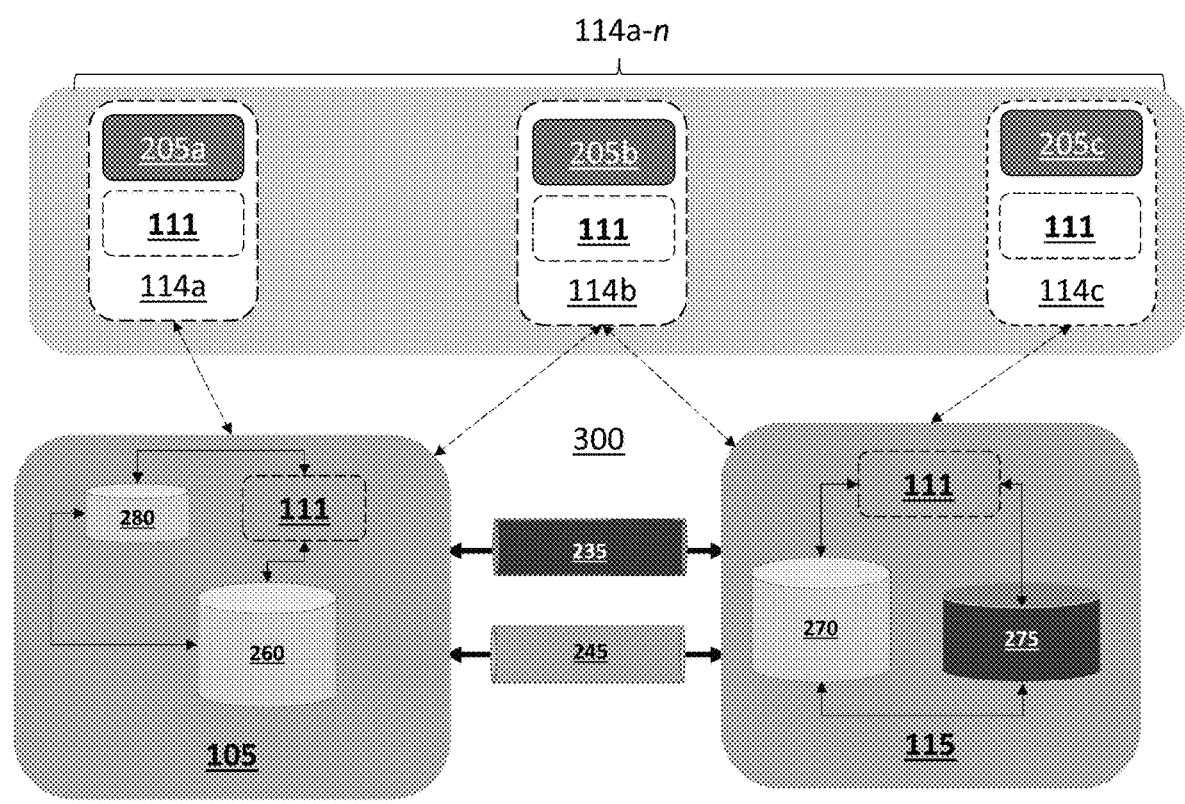
FIG. 3 is a block diagram of a storage area network (SAN) topology in accordance with embodiments of the present disclosure.

In embodiments, the HA 121 can expose and provide each host 114*a-n* logical unit number (LUN), defining a virtual device (e.g., a virtual volume 305 of FIG. 3). The virtual storage device can logically represent portions of at least one physical storage device 116*a-n*. For example, the DSP 110 can define at least one logical block address (LBA) representing a segmented portion of a disk's track 165 (e.g., a disk's sector 170). Further, the DSP 110 can establish a logical track or track identifier (TID) by grouping together one or more sets of LBAs. Thus, the DSP 110 can define a LUN using at least one TID. In addition, the DSP 110 can create a searchable data structure, mapping logical storage representations to their related physical locations. As such, the HA 121 can use the mapping to direct IO requests by parsing a LUN or TID from the request's metadata.

In embodiments, the array's DSP 110 can establish a storage/memory hierarchy based on one or more of the SLA and the array's storage/memory performance capabilities. For example, the DSP 110 can establish the hierarchy to include one or more tiers (e.g., subsets of the array's storage/memory) with similar performance capabilities (e.g., response times and uptimes). Thus, the DSP-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

Further, the DSP 110 can include a replication manager (RM) 111 that manages the array's memory and storage resources (e.g., global memory 150 and storage drives 116*a-n*). For instance, the RM 111 can have a logic/circuitry architecture that performs data replication and recovery services, as described in greater detail herein.

Figure 2:
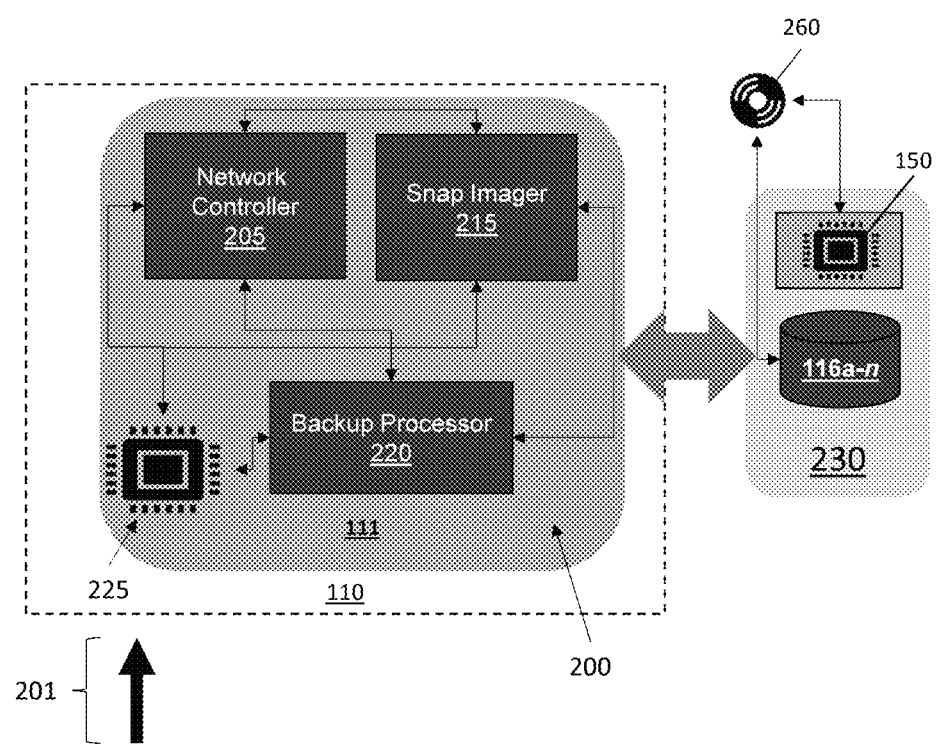
FIG. 2 is a block diagram of a data services processor in accordance with embodiments of the present disclosure.

Regarding FIG. 2, an RM 111 can include one or more software/hardware components 200 that perform one or more data replication or recovery services. For example, the RM 111 can include a network controller 205 that determines a network's topology (e.g., a SAN topology). In embodiments, the controller 205 can issue search signals (e.g., discovery packets) that include destination information of a networked device (e.g., the remote system 115 and hosts 114a-n). For example, the controller 205 can issue a search signal to the remote system 115 or the hosts 114a-n using their respective network locations (e.g., IP network address). The search signal can traverse the network (e.g., networks 118, 120 of FIG. 1) and maintain a network travel log. The signal can store the travel log in a communications layer defined by the network's configured communications protocol (e.g., TCP/IP).

In response to receiving the search signal, the remote system 115 or hosts 114a-n can issue a response signal to the array 105. For example, the remote system 115 and hosts 114a-n can parse the search signal's travel log to determine a return path for their respective response signals. Further, the controller 205 can analyze the response signal's travel path amongst other network metadata to determine a topology of the SAN.

Additionally, the controller 205 can determine a host's connectivity and accessibility to the array 105 and a remote system 115. Specifically, the hosts 114a-n can issue input/output (IO) requests to the array 105. In response to receiving an IO request, the controller 205 can parse metadata from the IO request. The metadata can include information specifying the network device type (e.g., host computing-device, application, remote array, etc.), timestamps corresponding to the IO request's data payload, and data state (e.g., an open or closed state).

Further, the RM 111 can also include a snapshot imager 215 215 that performs one or more data replication services. For instance, the imager 215 can take snapshots of data stored by the array's storage resources 230. Additionally, the resources 230 can include the array's storage devices 116a-n and global memory 150. In embodiments, the array 105 can include one or more daemons 260 that monitor read/write activity of the resources 230 and record the activity in their respective activity logs. Further, according to a data backup schedule, the daemons 230 can issue activity reports, including the logs and other data-related metadata). The reporting schedule can specify a snapshot duration, start time, or end time for each recording period. Thus, the daemons 260 can deliver their logs to the imager 215 at the end of each recording period. Additionally, the daemons 260 can provide each log with a unique snapshot ID, defining temporal-related information. Accordingly, the imager 215 can aggregate the logs from each daemon 260 to generate a snapshot.

As described herein, a company can use a storage array to perform cyber-related data replication and recovery services that, e.g., preserve data integrity. Accordingly, the RM 111 can further ensure data selected for replication is valid (e.g., 'good' data) by synchronizing the hosts 114a-n with the array 105. Thus, for example, the network controller 205 can provision the hosts 114a-n with resources enabling the hosts 114a-n to issue periodic IO sync messages.

In embodiments, the IO sync messages can include a write to a track that includes a timestamp generated by each host's clock. Additionally, the hosts 114a-n can issue the IO sync messages from each host-operated application requiring the array's storage services. Further, the controller 205 or the hosts 114a-n can dynamically set a sync messaging interval. For example, the sync interval can be based on a current or anticipated data change rate (i.g., based on a frequency of writes). In other examples, the sync interval can be initially predetermined (e.g., once per second) and later dynamically adjusted based on IO workloads. In another example, the network controller 205 can set the sync interval based on an asynchronous replication lag time. For example, the controller 205 can adjust a snapshot generation period, e.g., by changing the daemon reporting schedule.

Thus, the snapshot imager 215 can parse the daemon reporting logs to compare host-related timestamps to array-related timestamps of the data's datasets. If the timestamps are consistent (e.g., within an expected network lag time), the snapshot imager 215 can determine that the dataset is 'good.' In addition, the imager 215 can maintain a backup log in a local memory 225 that identifies data ready for back and data that has been backed up.

In embodiments, the RM 111 can include a backup processor 220 that backs up data on replication or secondary physical storage volumes, residing, e.g., on the remote system 115. For instance, the processor 220 can generate copies of 'good' data, e.g., specified by the backup log. Additionally, the backup processor 220 can perform the data backup via a push/pull request to/from the remote system 115.

Regarding FIG. 3, the RM 111 or one or more of its components 200 can reside in the array 105, remote system 115, or hosts 114a-n. Thus, in embodiments, the location of the RM 111 or its components 200 can correspond to a topology of a network (e.g., storage area network (SAN)) 300 that includes the array 105, remote system 115, or hosts 114a-n.

For example, the SAN 300 can include a topology with a host 114a having indirect access to replication data maintained by the remote system 115. In an indirect access topology, the remote system 115 can include the RM 111 and perform asynchronous data replication via an asynchronous remote data facility (RDF/A) communications channel 235. The RM 111 can perform asynchronous data replication according to any known or yet to be known technique. Further, in such a topology, the host 114a only has direct access to the array 105. As such, the host 114a can use indirectly access replicated data on the remote system 115 via the array 105 or other hosts 114b-c that have direct access to the remote system 115.

For instance, the host 114a can request the array 105 or the hosts 114b-c for replicated data from the remote system 115. For example, the array 105 or hosts b-c can include snapshot metadata 280, 205a-c that maps snapshots to recovery storage-related information (e.g., logical/physical address spaces). The array 105 or hosts 114b-c can append the snapshot metadata to the request. In response to receiving the request, the remote system 115 can obtain the snapshot related to the request from a snapshot storage 270. The remote system 115 can perform recovery operations using RM 111 and store the recovered data in a recovery storage 275. Further, the remote system 115 can push the data to the array's recovery storage 260 via a direct RDF channel 245 to the array 105. Thus, in turn, the array 105 can deliver the replicated data to the host 114a.

In embodiments, the SAN 300 can have a topology where a host 114b has direct access to the array 105 and the remote system 115. In such a topology, the remote system 115 can perform synchronous data replication services using the synchronous RDF (RDF/S) channel 245 (e.g., an in-band connection). Furthermore, the RM 111 and host application can share a clock for synchronizing data activities in such a direct topology. Thus, the RM 111 does not need to synchronize their respective clocks.

The following text includes details of one or more methods or flow diagrams in accordance with this disclosure. For simplicity of explanation, the methods are depicted and described as a series of acts. However, acts in accordance with this disclosure can occur in various orders or concurrently and with other acts not presented and described herein. Furthermore, not all illustrated acts may be required to implement the methods described in this disclosure.

Regarding FIG. 4, a method 400 can be executed by any of the array's other components (e.g., components 101 of FIG. 1). The method 400 describes recovering corrupt data. At 405, the method 400 can determine if backup data is accessible at a primary array or a secondary array. In embodiments, the host applications can be executed proximate to the primary array's location. If a host can access the backup data from the primary array, the method 400, at 425, can further include recovering corrupt data from the primary array. If the backup data is inaccessible from the primary array but accessible from the secondary array, the method 400, at 410, can also include transferring "good" data to the primary array.

In embodiments, at 410, method 400 can include performing data recovery techniques at the secondary array before the transfer or performing the data recovery techniques at the primary array after the data transfer. Further, the method 400, at 415, can include determining if the backup data on the secondary array was asynchronously copied from the primary array to the secondary array. Additionally, in response to a negative determination, at 425, the method 400 can recover corrupt data at the primary array. In response to a positive determination, the method 400, at 420, can also include aligning backup data timestamps with the data's corresponding application time. Additionally, the method 400, at 420, can include correlating backup data with time values associated with dataset states (e.g., open or closed) of the application(s). In embodiments, the backup data can be aligned using a fixed offset that represents an amount of delay between application time and the timestamps of the backup data. Finally, at 425, the method 400 can include completing the recovery of the corrupt data. It should be noted that each step of the method 400 can include any combination of techniques implemented by the embodiments described herein.

Regarding FIG. 5, a method 500 can be executed by any of the array's other components (e.g., components 101 of FIG. 1). The method 500 describes processing performed for an application configured for possible future data recovery when backup data is copied asynchronously to a secondary site. For example, at 505, the method 500 can include determining if a threshold time interval has elapsed since a previous application timestamp was recorded. In an embodiment, an elapsed time interval between iterations can be one second, although different iteration increments are possible. The iteration time could be slightly less than the time between consecutive snapshot iterations. Thus, if the time between consecutive snapshot iterations is ten minutes, the threshold interval can be nine minutes. If the threshold time has not passed, the method 500, at 505, can continue polling. The method 500, at 510, can also include providing "good" data copies with a timestamp. The timestamp can be an application time (e.g., time-related to the application that generated the data). At 510, the method 500 can also include aligning timestamps of backup data at a secondary site. It should be noted that each step of the method 500 can include any combination of techniques implemented by the embodiments described herein.

Figure 6:
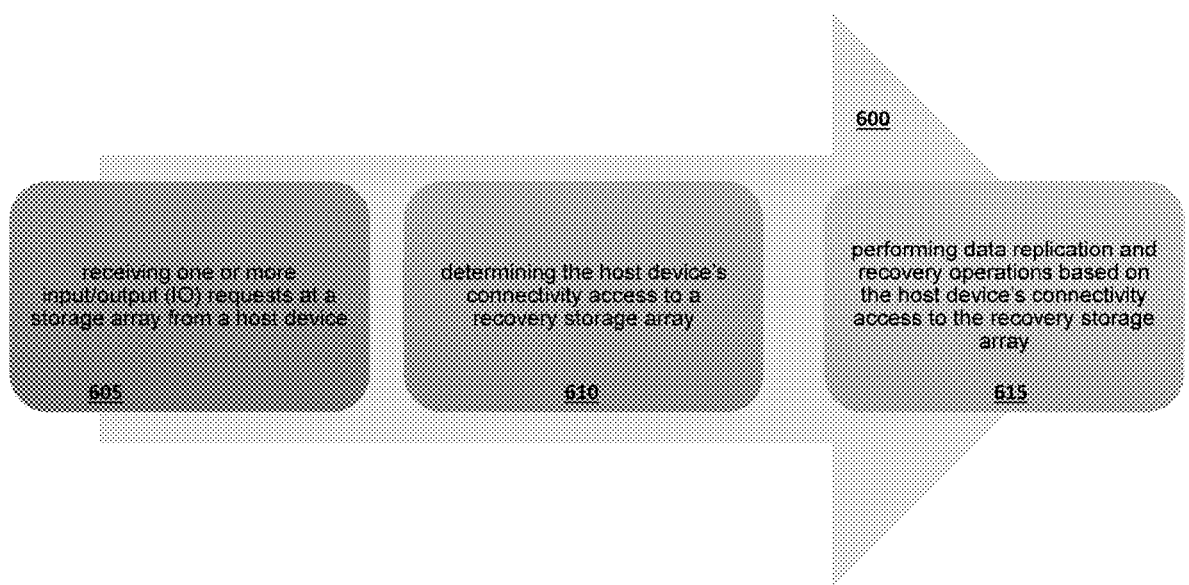
FIG. 6 is a flow diagram of a method for recovering data based on a host's connectivity to a recovery array in accordance with embodiments of the present disclosure.

Regarding FIG. 6, a method 600 can be executed by any of the array's other components (e.g., components 101 of FIG. 1). The method 600 relates to orchestrating the recovery of data in a cyber-related framework. At 605, the method 600 can include receiving input/output (IO) requests at a storage array from a host device. For example, the IO requests can include at least one data replication and recovery operation. The method 600, at 610, can also include determining the host device's connectivity access to a recovery storage array. At 615, method 600 can further include replicating or recovering data based on the host device's connectivity access to the recovery storage array. It should be noted that each step of the method 600 can include any combination of techniques implemented by the embodiments described herein.

Using the teachings disclosed herein, a skilled artisan can implement the above-described systems and methods in digital electronic circuitry, computer hardware, firmware, or software. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for the execution of a computer program include, by way of example, both general and special purpose microprocessors and any one or more processors of any digital computer. Generally, a processor receives instructions and data from a read-only memory, a random-access memory, or both. Thus, for example, a computer's essential elements are a processor for executing instructions and one or more memory devices for storing instructions and data. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated in special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system that includes a backend component can also implement the above-described techniques. The backend component can, for example, be a data server, a middleware component, or an application server. Further, a distributing computing system that includes a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts and combinations of the listed features.

One skilled in the art will realize that other specific forms can embody the concepts described herein without departing from their spirit or essential characteristics. Therefore, in all respects, the preceding embodiments are illustrative rather than limiting the concepts described herein. The appended claims thus recite the scope of this disclosure. Therefore, all changes embrace the meaning and range of equivalency of the claims.

What is claimed is:

1. A method, comprising:
receiving one or more input/output (IO) requests at a storage array from a host device, wherein the IO requests include at least one data replication and recovery operation;
determining the host device's connectivity access to a recovery storage array; and
performing data replication and recovery operations based on the host device's connectivity access to the recovery storage array, wherein performing the data recovery and replication operation further includes:
generating recovery metadata in response to receiving an IO write request; and
based on the storage system's replication topology and configuration, performing one or more of:
inserting state information of a dataset related to the IO write request into the recovery metadata, or
providing the recovery metadata with the state information and a timestamp of the dataset related to the IO write request.

2. The method of claim 1, further comprising:
determining a storage system's replication topology and configuration, wherein the topology includes the storage array and the recovery storage array.

3. The method of claim 2, further comprising:
enabling the host device to invoke the storage system to perform at least one data replication and recovery operation based on the host device's connectivity access to the recovery storage array.

4. The method of claim 2, further comprising:
providing the host device with connectivity access to the recovery storage array.

5. The method of claim 4, wherein providing the host device with connectivity access to the storage array, includes at least one of:
based on the storage system's replication topology and configuration:
providing the host device with direct connectivity access to the recovery storage array, or
providing the host device with indirect connectivity access to the recovery storage array.

6. The method of claim 1, further comprising:
generating snapshots of the storage array's stored data; and
performing a data recovery and replication operation in response to each snapshot generation.

7. The method of claim 6, wherein providing the recovery metadata with the state information and the timestamp, further includes:
synchronizing the host device's clock with the storage system's clock; and
obtaining an application time related to the data set.

8. The method of claim 7, wherein obtaining the application time further includes performing a first data replication operation, including updating at least one track of the data set based on an updated schedule or performing a second data replication operation, including monitoring the storage system's asynchronous replication lag time, and adjusting an interval for the generation of the snapshots based on the asynchronous replication lag time.

9. The method of claim 6, further comprising:
enabling the host device to link at least one of the snapshots to a recovery volume;
enabling the host device to evaluate the at least one linked snapshot; and
performing the data replication and recovery operations in response to receiving one or more instructions from the host device.

10. An apparatus including a memory and processor configured to:
receive one or more input/output (IO) requests at a storage array from a host device, wherein the IO requests include at least one data replication and recovery operation;
determine the host device's connectivity access to a recovery storage array; and
perform data replication and recovery operations based on the host device's connectivity access to the recovery storage array, wherein performing the data recovery and replication operation further includes:
generating recovery metadata in response to receiving an IO write request; and
based on the storage system's replication topology and configuration, performing one or more of:
inserting state information of a dataset related to the IO write request into the recovery metadata, or
providing the recovery metadata with the state information and a timestamp of the dataset related to the IO write request.

11. The apparatus of claim 10, further configured to:
determine a storage system's replication topology and configuration, wherein the topology includes the storage array and the recovery storage array.

12. The apparatus of claim 11, further configured to:
enable the host device to invoke the storage system to perform at least one data replication and recovery operation based on the host device's connectivity access to the recovery storage array.

13. The apparatus of claim 11, further configured to:
provide the host device with connectivity access to the recovery storage array.

14. The apparatus of claim 13, wherein providing the host device with connectivity access to the storage array, includes at least one of:
based on the storage system's replication topology and configuration:
provide the host device with direct connectivity access to the recovery storage array, or
provide the host device with indirect connectivity access to the recovery storage array.

15. The apparatus of claim 10, further configured to:
generate snapshots of the storage array's stored data; and
perform a data recovery and replication operation in response to each snapshot generation.

16. The apparatus of claim 15, wherein providing the recovery metadata with the state information and the timestamp, the apparatus is further configured to:
synchronize the host device's clock with the storage system's clock; and
obtain an application time related to the data set.

17. The apparatus of claim 16, wherein obtaining the application time further includes performing a first data replication operation, including updating at least one track of the data set based on an updated schedule or performing a second data replication operation, including monitoring the storage system's asynchronous replication lag time, and adjusting an interval for the generation of the snapshots based on the asynchronous replication lag time.

18. The apparatus of claim 15, further configured to:
enable the host device to link at least one of the snapshots to a recovery volume;
enable the host device to evaluate the at least one linked snapshot; and
perform the data replication and recovery operations in response to receiving one or more instructions from the host device.

* * * * *